(12) United States Patent
Wu et al.

(10) Patent No.: US 10,624,311 B2
(45) Date of Patent: Apr. 21, 2020

(54) WATER DISPENSER

(71) Applicants: FOSHAN SHUNDE MIDEA WATER DISPENSER MFG. CO., LTD., Foshan (CN); MIDEA GROUP CO., LTD., Foshan (CN); PRIMO WATER CORPORATION, Winston-salem, NC (US)

(72) Inventors: Jiang Wu, Foshan (CN); Tyler Ayers, Winston-salem, NC (US); Luis Saldana, Winston-salem, NC (US)

( * ) Notice: Subject to any disclaimer, the term of this patent is extended or adjusted under 35 U.S.C. 154(b) by 310 days.

(21) Appl. No.: 15/682,553

(22) Filed: Aug. 22, 2017

(65) Prior Publication Data

US 2019/0000046 A1 Jan. 3, 2019

(30) Foreign Application Priority Data

Jun. 29, 2017 (CN) .......................... 2017 1 0531817

(51) Int. Cl.
*A01K 7/06* (2006.01)
*A01K 39/026* (2006.01)
*A01K 1/035* (2006.01)

(52) U.S. Cl.
CPC .............. *A01K 7/06* (2013.01); *A01K 1/0356* (2013.01); *A01K 39/026* (2013.01)

(58) Field of Classification Search
CPC .......... A01K 39/026; A01K 7/06; A01K 7/02; A01K 1/0356
See application file for complete search history.

(56) References Cited

U.S. PATENT DOCUMENTS

| | | | | |
|---|---|---|---|---|
| 733,966 | A * | 7/1903 | Horwart | A01K 7/06 119/75 |
| 1,204,066 | A * | 11/1916 | Rassman | A01K 7/06 119/75 |
| 1,806,473 | A * | 5/1931 | Langer | A01K 7/06 119/75 |
| 1,872,645 | A * | 8/1932 | Barker | A01K 39/026 119/77 |
| 2,676,567 | A * | 4/1954 | Bowers | A01K 7/02 119/77 |
| 4,079,699 | A * | 3/1978 | Longmore | A01K 5/0291 119/51.11 |
| 4,479,456 | A * | 10/1984 | Schweiger | A01K 7/06 119/51.5 |

(Continued)

*Primary Examiner* — Magdalena Topolski
(74) *Attorney, Agent, or Firm* — Kilpatrick Townsend & Stockton, LLP

(57) ABSTRACT

A water dispenser including a body and a water outlet mechanism, the body includes a base and a supply pipe inside of the body, multiple mounting grooves set on the side of the base; the water outlet mechanism arranged on the base, including a diversion component including a diversion pipe and a diversion valve installed in a pipeline of the diversion pipe; an end of the diversion pipe is connected to the supply pipes, the other end of the diversion pipe extending into the mounting groove; a linkage component, an inner end of that connected to the valve, an outer end of that extending into the mounting groove; when the outer end of the linkage component suffers an inward force, making the valve move to conduct the water inlet chamber and the diversion chamber; and a resetting component that connects the base and the linkage component.

11 Claims, 4 Drawing Sheets

(56) References Cited

U.S. PATENT DOCUMENTS

2008/0035241 A1\* 2/2008 Wittbold ................. A01K 7/06
141/361
2008/0127901 A1\* 6/2008 Kleinsasser .......... A01K 5/0225
119/51.11

\* cited by examiner

WATER DISPENSER

CROSS-REFERENCES TO RELATED APPLICATIONS

This application claims priority to Chinese Patent Application No. 201710531817.5, filed Jun. 29, 2017, which is incorporated by reference herein for all purposes.

FIELD OF THE INVENTION

The present invention relates to a field of water dispenser, especially to a water dispenser.

BACKGROUND OF THE INVENTION

With the increasing of people feeding small animals, the problems relating to small animals drinking water have been taken into account gradually. At present, a specialized tray is designed for feeding small animals, which needs people to add water into the tray manually, when there are many animals needing to feed and many trays, adding water into the trays sequentially will become tedious, being detrimental to alleviate people's work for feeding small animals.

As a result, a water dispenser is in urgent need that allows small animals to add water into the tray themselves.

SUMMARY OF THE INVENTION

The present invention discloses a water dispenser, to allow small animals to add water into the tray themselves, so as to alleviate people's work for feeding small animals.

To realize the above aim, the present invention discloses a water dispenser includes:

a body, that includes a base and a supply pipe inside of the body, multiple mounting grooves set on the side of the base;

a water outlet mechanism, arranged on the base, including:

a diversion component that includes a diversion pipe and a diversion valve installed in a pipeline of the diversion pipe; an end of the diversion pipe is connected to the supply pipes, and the other end of the diversion pipe extends into the mounting groove of the tray.

a linkage component, that an inner end of the linkage component is connected to the valve, an outer end of the linkage component extends into the mounting groove of the tray; when the outer end of the linkage component suffers an inward force, making the valve open to conduct the diversion pipe; and a resetting component, that connects the base and the linkage component, when the inward force suffered by the linkage component is released, making the linkage component to move outward to cause the moving of the valve, therefore the diversion pipe is closed.

Preferably, the diversion component includes a diversion valve, the diversion valve includes a water inlet chamber connected with the supply pipe; a diversion chamber, the diversion chamber is separated from the water inlet chamber; and a valve sliding up and down along the diversion chamber. An end of the diversion pipe is connected with the diversion chamber, the other end of the diversion pipe extends into the mounting groove of the tray.

Preferably, a bottom wall of the water inlet chamber has a nozzle connected to the diversion chamber. The linkage component includes a connecting rod and a push rod. An inner end of the connecting rod is connected with a lower end of the valve, the rod part closing the inner end of the connecting rod is rotationally connected with the base. An outer end of the connecting rod is in a lap joint with an inner end of the push rod. When the outer end of the connecting rod moves upward, upper part of the valve plugs the nozzle.

Preferably, the diversion component includes a resettable dish spring, inside of the valve has a limit flange. An end of the resettable dish spring is connected with the bottom surface of the limit flange. The other end of the resettable dish spring is connected to the bottom wall of the diversion chamber.

Preferably, the outer end of the connecting rod has a lap part, the outer edge of the lap part is in an arc transition section from the bottom up; the inner end of the push rod has a lap surface for lapping the lap part, the lap surface is obliquely provided facing the mounting groove of the tray.

Preferably, a seal ring is provided inside of the valve, configured for sealing the nozzle when the valve is contacting the nozzle.

Preferably, a mounting shell is carried on the base, the mounting shell has a chute for the connecting rod to slide on. A protrusion is carried on a bottom wall of the chute. The push rod is set in the chute, and a recession channel is carried on a bottom surface of the push rod allowing the protrusion to pass through, an inner end of the resetting component is connected with the protrusion, the outer end of the resetting component is connected with an outer end of the push rod.

Preferably, the outer end of the resetting component protrudes from the outer end surface of the push rod.

Preferably, the push rod is a mold box with an opening, the opening is dimensioned and shaped as the recession channel.

Preferably, the water dispenser includes a valve control apparatus, the valve control apparatus includes an electric control valve arranged at the water inlet end of the supply pipe or the diversion valve, a control switch electrically connected with the electric control valve.

Preferably, the water dispenser further includes a water level monitoring apparatus, the water level monitoring apparatus includes a water level detector; a controller, the controller is electrically connected with the water level detector and the electric control valve; the water level detector is arranged in the mounting groove of the tray, to detect value of the water level of the tray, the controller is configured for controlling the electric control valve to be closed, when value of the water lever equals to or is greater than a preset value of the water level.

Preferably, the water dispenser includes a tray, the tray is arranged in the mounting groove.

In terms of the water dispenser of the present invention, by setting the water outlet mechanism arranged on the base of the body, the water outlet mechanism includes a diversion component, a linkage component and a resetting component, when the outer end of the linkage component suffers an inward force, making the valve to open to conduct the diversion pipe, the water is flowing through the diversion pipe to the tray arranged in the mounting groove for small animals drinking. When the inward force suffered by the linkage component is released, the resetting component makes the linkage component to move outward to cause the moving of the valve, therefore the diversion pipe is closed, in this case, the supply pipe stops supplying water to the tray. Due to the outer end of the linkage component extends into the mounting groove, when small animals push the tray inward, the tray pushes the linkage component to move inward, so as to realize the adding of water into the tray. Therefore, the water dispenser of the present invention, only by arranging the water outlet mechanism on the base, alleviates people's work for feeding small animals.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DESCRIPTION OF REFERENCE SIGNS

Figure 1:
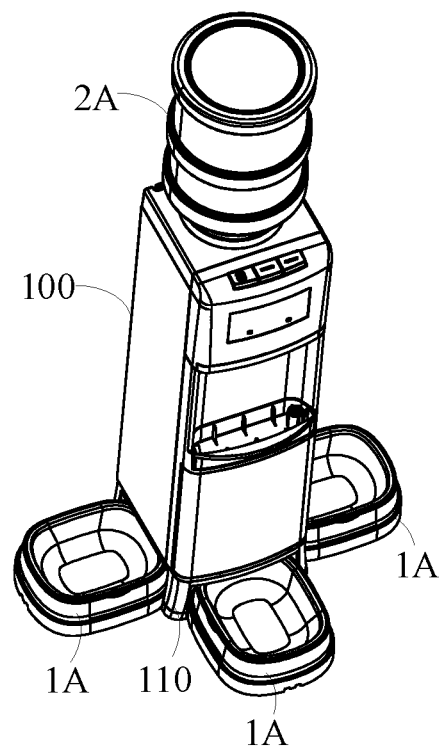
FIG. 1 is a structural diagram of a water dispenser of an embodiment of the present invention.
Figure 2:
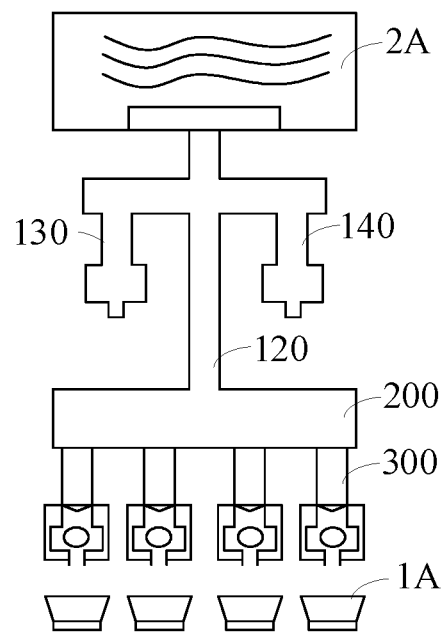
FIG. 2 is a schematic diagram of the water dispenser in FIG. 1.
Figure 3:
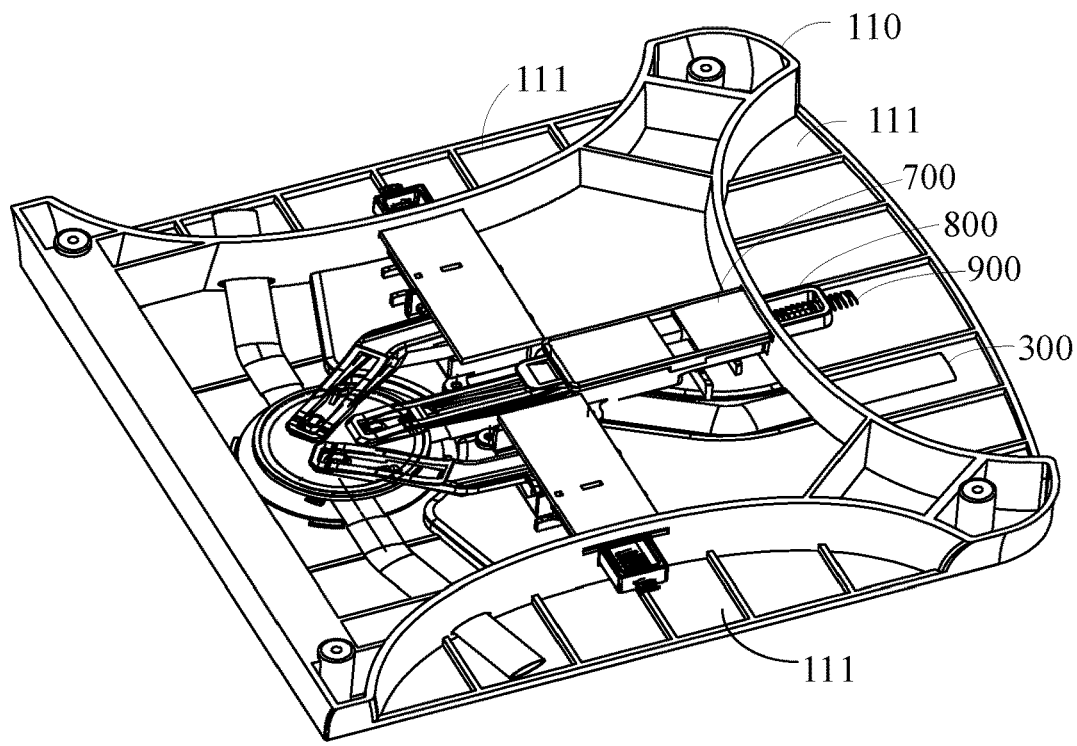
FIG. 3 is a structural diagram of the base and the water outlet mechanism in FIG. 1.
Figure 4:
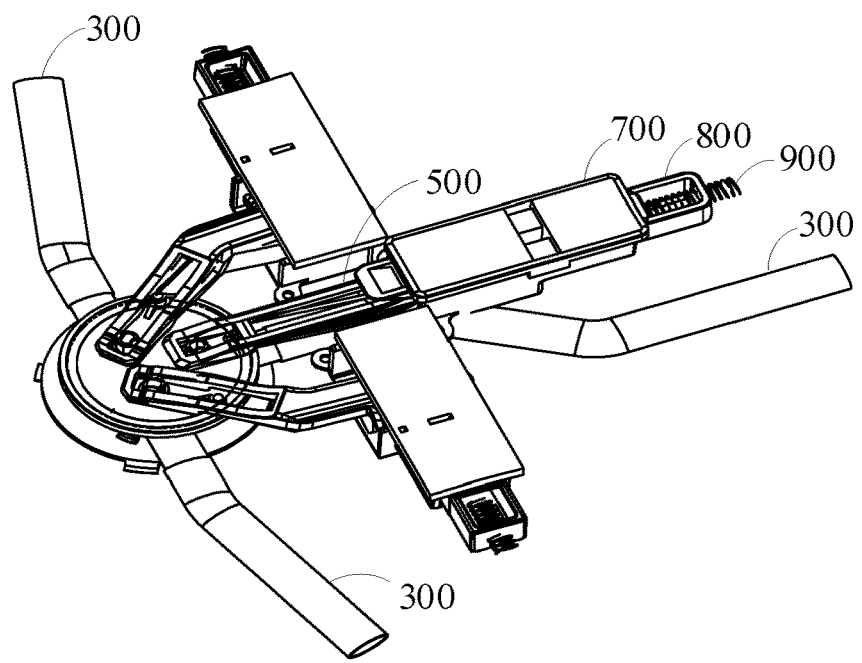
FIG. 4 is a schematic diagram of the water outlet mechanism in FIG. 3.
Figure 5:
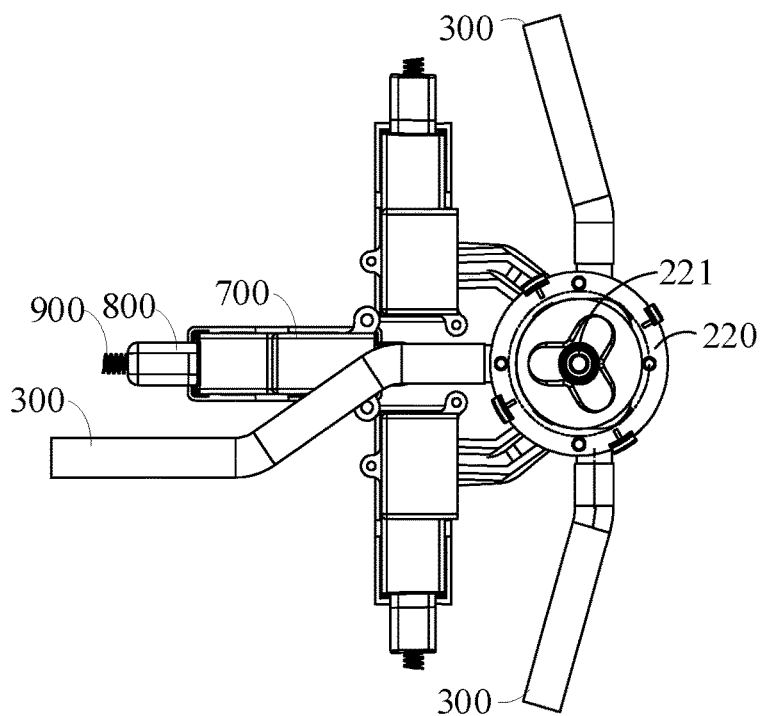
FIG. 5 is a top view of the water outlet mechanism in FIG. 4.

| Num | Title |
|-----|-------|
| 100 | Body |
| 110 | Base |
| 111 | Mounting groove of the tray |
| 120 | Supply pipe |
| 130 | Hot water pipe |
| 140 | Cold water pipe |
| 200 | Diversion valve |
| 210 | Main body |
| 211 | Water inlet chamber |
| 212 | Diversion chamber |
| 220 | Upper valve cover |
| 221 | Water inlet end |
| 230 | Lower valve cover |
| 300 | Diversion pipe |
| 400 | Valve |
| 410 | Limit flange |
| 500 | Connecting rod |
| 510 | Inner connecting section |
| 520 | Outer connecting section |
| 521 | Lap part |
| 600 | Resettable dish spring |
| 700 | Mounting shell |
| 710 | Upper shell |
| 720 | Lower shell |
| 730 | Chute |
| 731 | Protrusion |
| 800 | Push rod |
| 810 | Lap surface |
| 900 | Reduction component |
| 1A | Tray |
| 2A | Bottled water |

Objective achieving, function features, and advantages of the present invention are further described with reference to the embodiments and the accompany drawings.

DETAILED DESCRIPTION OF THE EMBODIMENTS

Technical solutions of the present invention are further described in detail with reference to the accompanying drawings and embodiments. It is to be understood that the specific embodiments described herein are merely used for describing the present invention, but are not intended to limit the present invention.

It is to be understood that, all the directional instructions in the present disclosure (such as top, down, left, right, front, back) can only be used for explaining relative position relations, moving condition of the elements under a special form (referring to figures), and so on, if the special form changes, the directional instructions changes accordingly.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In the description of the present disclosure, "a plurality of" means at least two, such as two, three, and so on, unless specifically limited otherwise.

The present invention discloses a water dispenser, not only for human to use, but also for small animals to drink water themselves, so as to alleviate people's work for feeding small animals.

The water dispenser of the present invention includes a body 100 and a water outlet mechanism, in which, the body 100 includes a base 110 and a supply pipe 120 arranged thereto. Multiple mounting grooves 111 set on the side of the base 110; the water outlet mechanism is set on the base 110, including a diversion component, a linkage component, and a resetting component 900.

The diversion component includes a diversion pipe 300 and a valve 400 installed in a pipeline of the diversion pipe 300; an end of the diversion pipe 300 is connected to the supply pipes 120, and the other end of the diversion pipe 300 extends into the mounting groove 111 of the tray.

An inner end of the linkage component is connected to the valve 400, an outer end of the linkage component extends into the mounting groove 111 of the tray; when the outer end of the linkage component suffers an inward force, making the valve 400 open to conduct the diversion pipe 300.

In the embodiment, the valve 400 is connected with the water inlet end of the diversion pipe 300. The valve 400 may be one of a solenoid valve or an upper or lower telescopic slider, or a tilting spacer that the spacer is shaped and dimensioned to imitate the cross section of the diversion pipe, and the material is flexible material such as silica gel or rubber.

The valve 400 is the solenoid valve 400, the diversion pipe 300 is a flexible plastic pipe. The solenoid valve is arranged on the flexible plastic pipe. When the outer end of the linkage component suffers an inward force, moving inward accordingly, making the solenoid valve to close the diversion pipe 300;

When the outer end of the linkage component suffers an inward force, making the valve 400 to move so as to conduct the water inlet chamber 211 and the diversion chamber 212. The linkage component may be formed by multiple ways, such as gear-driven, that is the linkage component includes a gear set on the base, a crank connected to the gear, as well as a rock push plate configured for engaging the gear, the rock push plate is connected with the valve, when the crank suffers an inward force, the gear rotates to drive the rock push plate moving downward, the valve is moving upward accordingly, to open the diversion pipe 300, which will be introduced hereinafter.

A resetting component 900 that connects the base 110 and the linkage component, when the inward force suffered by the linkage component is released, driving the linkage component to move outward to cause the moving of the valve 400, as a result, the water inlet chamber 211 and the diversion chamber 212 are separated. The resetting component 900 may be a spring or a torsion spring, choosing which owes comparative good flexibility, the spring is preferred.

The diversion valve 200 includes a main body 210, an upper cover 220 and a lower cover 230 respectively covering the main body 210. The upper cover 220 has a water inlet end 221, the upper cover 220 and the upper part of the main body 220 may form the water inlet chamber 211. The lower cover 230 and the lower part of the main body 220 may form multiple diversion chamber 212. The valve 400 arranged through the lower cover 230 slides up and down the diversion chamber 212.

When the water disperser is working, water in a bottled water 2A of a water inlet mechanism is flowing downward from the water inlet chamber 211, when at the exit point of the water inlet mechanism, a part of water would flow into the diversion component, a part of water would flow into hot-water side components via a hot-water pipe 130, the rest of water would flow into cold-water side components via a cold-water pipe 140.

Figure 6:
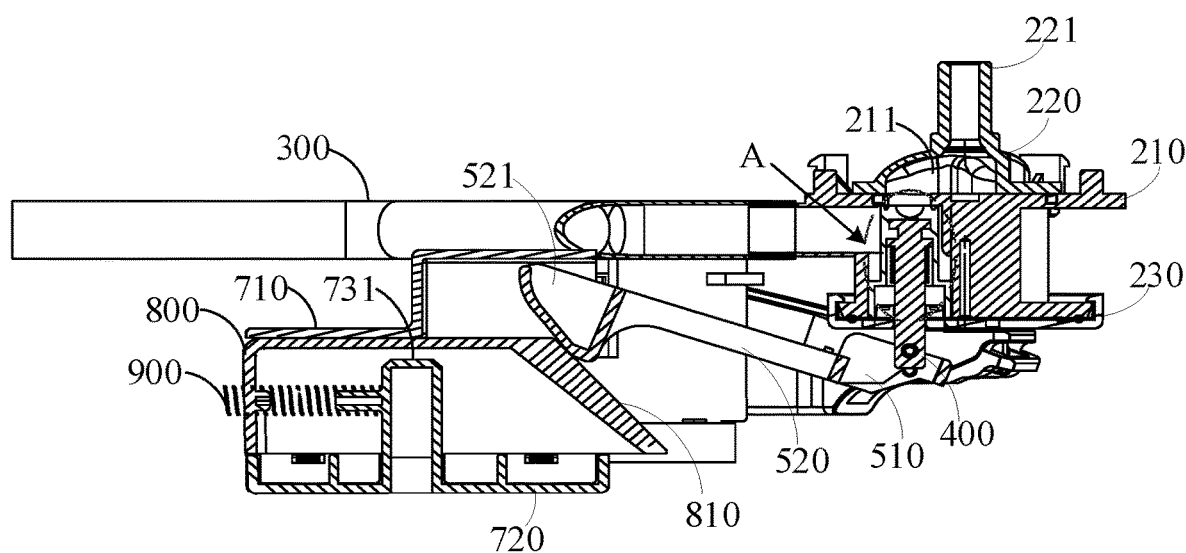
FIG. 6 is a cutaway view of the water outlet mechanism under the circumstances, the valve is far away from the nozzle.
Figure 7:
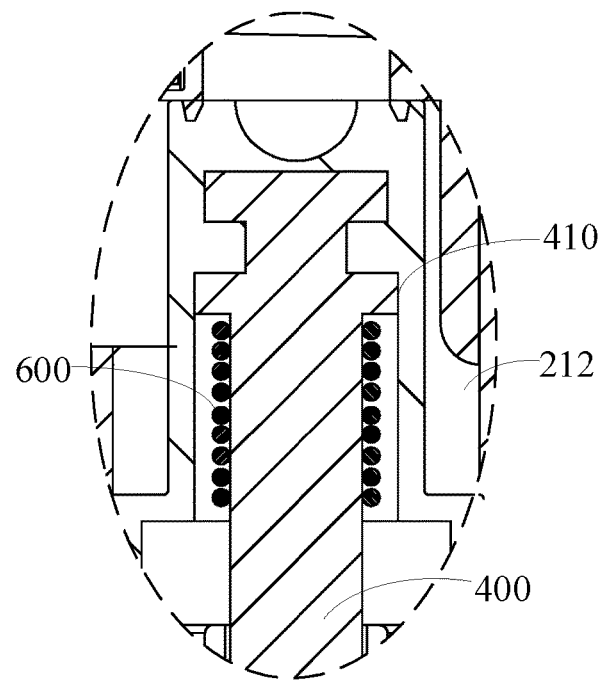
FIG. 7 is a larger view of location A in FIG. 6.
Figure 8:
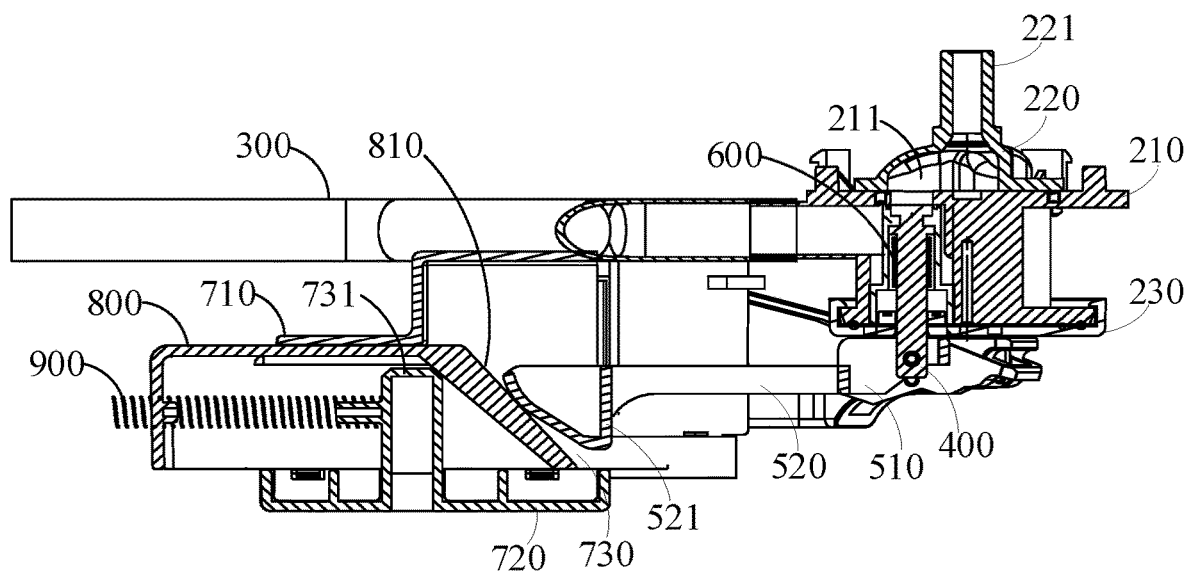
FIG. 8 is a cutaway view of the water outlet mechanism under the circumstances, the valve is plugging the nozzle.

The water dispenser of the present invention, by arranging the water outlet mechanism on the tray of the body 100, the water outlet mechanism includes a diversion component, a linkage component and a resetting component 900, as shown in FIG. 6 and FIG. 7, when the outer end of the linkage component suffers an inward force, driving the valve 400 to move to open the diversion pipe 300, the water flows into the tray 1A arranged in the mounting groove 111, allowing small animals to drink water. As shown in FIG. 8, when the inward force suffered by the linkage component is released, the resetting component 900 makes the linkage component to move outward to cause the moving of the valve 400, therefore the diversion pipe 300 is closed, in this case, the supply pipe stops supplying water to the tray 1A. Due to the outer end of the linkage component extends into the mounting groove, when small animals push the tray 1A inward, the tray 1A pushes the linkage component to move inward, so as to realize the adding of water into the tray 1A. Therefore, the water dispenser of the present invention, only by arranging the water outlet mechanism on the base, alleviates people's work for feeding small animals.

In an embodiment, a diversion valve 200 is arranged between the diversion pipe 300 and the supply pipe 120. The diversion valve 200 includes a water chamber connected with the supply pipe 120, a diversion chamber 212 separated from the water inlet chamber 211, and a valve 400 sliding up and down along the diversion chamber 212. An end of the diversion pipe 300 is connected to the diversion chamber 212. The other end of the diversion chamber 212 extends into the mounting groove 111.

In the embodiment, as shown in FIG. 6 and FIG. 7, when the outer end of the linkage component suffers an inward force, driving the valve 400 to move so as to conduct the water inlet chamber 211 and the diversion chamber 212, the water in the supply pipe 120 flows into the diversion valve 200 in the diversion component, and being shunted in the water inlet chamber 211 of the diversion valve 200, into multiple diversion chambers 212, then flowing through diversion pipes 300 corresponded to the diversion chambers 212, into the tray 1A arranged on the mounting groove 111, therefore, to allow small animals to drink water. As shown in FIG. 8, when the inward force suffered by the linkage component is released, the resetting component 900 drives the linkage component to move outward to make moving of the valve 400, so as to separate the water inlet chamber 211 from the diversion chamber 212, thus the supply pipe 120 stops supplying water to the diversion valve 200. Due to the outer end of the linkage component extending into the mounting groove, when small animals push the tray 1A inward, the tray 1A pushes the linkage component moving inward, therefore, to realize the water dispenser adding water into the tray 1A.

In an embodiment of the present invention, a bottom wall of the water inlet chamber 211 has a nozzle connected to the diversion chamber 212. The linkage component includes a connecting rod 500 and a push rod 800. An inner end of the connecting rod 500 is connected with a lower end of the valve 400, the rod part closing the inner end of the connecting rod 500 is rotationally connected with the base 110. An outer end of the connecting rod 500 is in a lap joint with an inner end of the push rod 800. When the outer end of the connecting rod 500 moves upward, upper part of the valve 400 plugs the nozzle.

More specifically, the rod part closing the inner end of the connecting rod 500 has a shaft hole, configured for rotationally connecting a shaft of the base, enabling the connecting rod 500 to form an inner connecting section 510 connected to the valve 400, and an outer connecting section 520 extending from the inner connecting section 510. Of course, in other embodiments, between the inner connecting section 510 and the outer connecting section 520 arranges a shaft configured for rotationally connecting a shaft hole of the base.

In the embodiment, when small animals push the tray 1A into the mounting groove 111, the side wall of the tray 1A resists against the outer end of the push rod 800. The inner end of the push rod 800 pushes the connecting rod 500 inward, to enable the outer end of the connecting rod 500 moving upward, thus to enable the inner end of the connecting rod 500 moving downward, to enable the valve 400 to move downward, so as to open the nozzle. At this point, the water in the supply pipe 120 may flow downward into the water inlet chamber 211 of the diversion valve 200, flowing through the water outlet into the diversion chamber 212, then into the diversion pipe 300 connected to the diversion chamber 212, finally into the tray 1A. When the small animals stops pushing the tray 1A, an elastic resetting component drives the push rod 800 to move outward, enabling the inner end of the push rod to depart from the outer end of the connecting rod 500, the outer end of the connecting rod 500 may move downward because of own gravity, accordingly, the inner end of the connecting rod 500 move upward, to drive the valve 400 moving upward, therefore, the nozzle is plugged, and the water inlet chamber 211 and the diversion chamber 212 are separated, the diversion valve 200 stops adding water to the tray 1A.

Furthermore, the diversion component includes a resettable dish spring 600. Inside of the valve 400 has a limit flange 410. An end of the resettable dish spring 600 is connected with the bottom surface of the limit flange 410. The other end of the resettable dish spring 600 is connected to the bottom wall of the diversion chamber 212.

In the embodiment, when the tray 1A is pushed out as well as the mounting groove 111, along with the push rod 800 gradually departing from the connecting rod 500, the outer end of the connecting rod 500 moves downward because of own gravity, to drive the valve 400 moving upward. Since own gravity of the connecting rod 500 is quite light, a resettable dish spring 600 is provided to overcome the own gravity of the connecting rod 500 is not sufficient to drive the valve 400 moving upward. When the valve 400 is in a state that the nozzle is opened, the resettable dish spring 600 is pressed between the bottom wall of the diversion chamber 212 and the limit flange 410, the resettable dish spring 600 therefore accumulates elastic potential energy. At the process of the valve 400 moving from bottom to up to plug the nozzle, the resettable dish spring 600 releases the elastic potential energy to push the valve 400 moving upward quickly, so as to accelerate the valve 400 to plug the nozzle quickly. When the valve 400 is plugging the nozzle, the resettable dish spring 600 can best be in the compression state, enabling the valve 400 capable of enough potential energy continuing to move upward. Therefore, the limit flange 410 is attaching to the nozzle more tightly, to avoid water leakage.

In the embodiment, the outer end of the connecting rod 500 has a lap part 521, the outer edge of the lap part 521 is in an arc transition section from the bottom up; the inner end of the push rod 800 has a lap surface 810 for lapping the lap part 521, the lap surface 810 is obliquely provided facing the mounting groove 111.

The lap part 521 is carried on the outer end of the outer connecting section 520, by setting the outer edge of the lap part 521 in the arc transition section from the bottom up, and setting the lap surface 810 obliquely facing the mounting groove 111, at the process of relative motion at the push rod 800 and the connecting rod 500, the friction force therebetween is reduced to avoid damage from friction.

In the embodiment, a seal ring (not shown in figures) is provided inside of the valve 400, configured for sealing the nozzle when the valve is plugging the nozzle.

The seal ring fits on the limit flange 410, when the limit flange 410 is plugging the nozzle, tight fit between the seal ring and the nozzle may avoid the water leakage of the nozzle.

In order to arrange the linkage component and the resetting component 900, a mounting shell 700 is carried on the base 110, the mounting shell 700 has a chute 730 for the connecting rod 500 to slide on. A protrusion 731 is carried on a bottom wall of the chute 730. The push rod 800 is set in the chute 730, and a recession channel is carried on a bottom surface of the push rod allowing the protrusion 731 to pass through, an inner end of the resetting component 900 is connected with the protrusion 731, the outer end of the resetting component 900 is connected with an outer end of the push rod 800.

In the embodiment, the mounting shell 700 includes a lower shell 720, and an upper shell 710 for covering the lower shell 720, the chute 730 is formed by the lower shell 720 and the upper shell 710 combined. The protrusion 710 is formed on the upper surface of the lower shell 720. When the push rod 800 slides relatively to the chute 730, the recession channel is above the protrusion 731.

Furthermore, the push rod 800 is a mold box with an opening, the opening is dimensioned and shaped as the recession channel.

In the embodiment, the mold box includes a top plate and four side walls extending from the edge of the top plate. Bottom edge of the four side walls surrounds to form the opening, the mold box in hooded appearance is arranged above the protrusion 731, enabling the protrusion 731 to be covered in the recession channel. When the push rod 800 slides relatively in the chute 730, the protrusion 731 slides relatively in the recession channel. In this case, only the edge of the opening will contact with the bottom surface of the chute 730, the contact area is comparatively small, so as to reduce the friction at the process of the push rod 800 sliding.

Of course, in other embodiments, the push rod 800 may be in other shapes, such as rectangular-shaped or cylindrical-shaped, only ensuring the bottom surface of the push rod 800 to have the recession channel.

Furthermore, the outer end of the resetting component 900 protrudes from the outer end surface of the push rod 800, with this setting, at the process of moving the tray 1A out of the mounting groove, the resetting component 900 imposes an outward force to the tray 1A, an auxiliary push of the tray 1A to move outward. And the relative force between the tray 1A and the push rod 800 is buffered, to avoid the elastic deformation of the tray 1A suffered undue force.

The number of the mounting grooves 111 may be determined according to the user's need, probably 1 to 4 are best. In the embodiment, the number of the mounting grooves 11 is three, set corresponding to three trays 1A. The three mounting grooves 111 are set on the three sides of the base separately, accordingly, the diversion component includes three diversion pipes 300 corresponding to the three trays 1A. Apparently, in other embodiment, each side of the base 100 may have one mounting groove 111, as a result, there are four trays 1A arranged therein Furthermore, in order to allow the water dispenser being used by small animals simultaneously, the base 110 has multiple mounting grooves 111. Accordingly, the diversion valve 200 of the water outlet mechanism has multiple diversion chambers 212, and the diversion mechanism has multiple diversion pipes 300, multiple linkage components and multiple resetting components 900. Each diversion pipe 300, each linkage component and each resetting component are provided corresponding to each of the multiple diversion chambers 212.

In the embodiment, multiple mounting grooves 111 are provided corresponding to multiple trays 1A. The number of the mounting grooves 11 are determined in accordance with the user's need, preferably 1 to 4. And multiple mounting grooves 111 are arranged along the sides of the base 110. If the number of the mounting grooves 111 is three, the diversion valve 200 is arranged on one side of the base 110, the mounting shells 700 of the three push rods 800 are set in T-type configuration corresponding to the diversion valve 200, to ensure the base enough space for installing the connecting rods 500 and the push rods 800; when needing to arrange four trays 1A, the diversion valve 200 is arranged in the center of the base, four mounting shells 700 of the four push rods 800 are arranged in cruciform setting from the diversion valve 200 centered. Therefore, by enlarging the area of the base, the base has enough space for installing the connecting rods 500 and the push rods 800.

Furthermore, taking the resetting component 900 may accumulate elastic potential energy when the tray 1A is mounted in the mounting groove 111 into account, in order to avoid the high level of the elastic potential energy pushing the tray 1A away from the mounting groove 111, elastic buckles are carried on the both opposite side wall of the mounting groove 111, and slots for clamping the elastic buckles are carried on the both opposite side wall of the tray 1A.

In the embodiment, at the process of pushing the tray 1A into the mounting groove 111 until the valve 400 opens the nozzle, the slots of the tray 1A would clamp the elastic buckles carried on the mounting groove 111, to limit the activity of the tray 1A, so as to avoid the high level of the elastic potential energy pushing the tray 1A away from the mounting groove 111. When needing to draw out the tray 1A, an outward force added to the tray 1A to overcome the binding force of the elastic buckles, that is, the tray 1A can be drawn out.

To avoid accidental touching the linkage component and water leakage of the water dispenser, the water dispenser includes a valve control apparatus that includes an electric control valve arranged at the water inlet end of the supply pipe or the diversion valve, and a control switch electrically connected with the electric control valve.

Furthermore, the water dispenser further includes a water level monitoring apparatus, the water level monitoring apparatus includes a water level detector; a controller, the controller is electrically connected with the water level detector and the electric control valve; the water level detector is arranged in the mounting groove of the tray, to detect value of the water level of the tray, the controller is configured for controlling the electric control valve to be closed, when value of the water lever equals to or is greater than a preset value of the water level.

In the embodiment, the water level detector is configured for detecting the water level changing of the tray 1A, and the value of the water level received may be transmitted to the controller. The controller may compare the value of the water level with a preset value, when the value of the water level equals to or is greater than the preset value, the controller controls the electric control valve to be closed.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:
1. A water dispenser comprising:
a water source configured to supply water to the water dispenser;
a body, including a base and a supply pipe inside of the body;
a tray arranged on bottom periphery of the body and configured to supply water to an animal;
a mounting groove provided on bottom of the body and configured to mount the tray;
a water outlet mechanism, arranged on the base, comprising:
a diversion component, including a diversion pipe and a valve body installed in a pipeline of the diversion pipe; an end of the diversion pipe is connected to the supply pipe, and the other end of the diversion pipe extends into the mounting groove;
a linkage component, wherein an inner end of the linkage component being connected to the valve body, an outer end of the linkage component extending into the mounting groove; wherein the valve body moves to open the diversion pipe when the outer end of the linkage component suffers an inward force from the animal; and
a resetting component connecting the base and the linkage component;
wherein when the inward force suffered by the linkage component released, the linkage component moves outward to cause moving of the valve body, thus the diversion pipe is closed.
2. The water dispenser of claim 1, wherein the diversion component further comprises a diversion valve assembly, the diversion valve assembly comprises:
a water inlet chamber connected with the supply pipe; and
a diversion chamber, the diversion chamber is separated from the water inlet chamber, wherein the valve body is configured to slide up and down along the diversion chamber;
wherein one end of the diversion pipe is connected with the diversion chamber, the other end of the diversion pipe extends into the mounting groove.
3. The water dispenser of claim 2, wherein a bottom wall of the water inlet chamber has a nozzle connected to the diversion chamber, the linkage component includes a connecting rod and a push rod, an inner end of the connecting rod is connected with a lower end of the valve body, the rod part closing the inner end of the connecting rod is rotationally connected with the base, an outer end of the connecting rod is in a lap joint with an inner end of the push rod when the outer end of the connecting rod moves upward, upper part of the valve body plugs the nozzle.
4. The water dispenser of claim 3, wherein the diversion component comprises a resettable dish spring and a limit flange provided inside of the valve body, an end of the resettable dish spring is connected with the bottom surface of the limit flange, the other end of the resettable dish spring is connected to the bottom wall of the diversion chamber.
5. The water dispenser of claim 3, wherein the outer end of the connecting rod has a lap part, the outer edge of the lap part is in an arc transition section from the bottom up; the inner end of the push rod has a lap surface for lapping the lap part, the lap surface is obliquely provided facing the mounting groove.
6. The water dispenser of claim 3, wherein a seal ring is provided inside of the valve body configured for sealing the nozzle when the valve body contacts the nozzle.
7. The water dispenser of claim 3, wherein a mounting shell is carried on the base, the mounting shell has a chute for the connecting rod to slide on, a protrusion is carried on a bottom wall of the chute, the push rod is set in the chute, and a recession channel is carried on a bottom surface of the push rod allowing the protrusion to pass through, an inner end of the resetting component is connected with the protrusion, the outer end of the resetting component is connected with an outer end of the push rod.
8. The water dispenser of claim 3, wherein the outer end of the resetting component protrudes from the outer end surface of the push rod.
9. The water dispenser of claim 7, wherein the push rod is a mold box with an opening, the opening is dimensioned and shaped as the recession channel.
10. The water dispenser of claim 1, the water dispenser comprises a valve control apparatus, the valve control apparatus comprises an electric control valve arranged at the water inlet end of the supply pipe or the diversion valve assembly, a control switch electrically connected with the electric control valve.
11. The water dispenser of claim 10, wherein further comprises a water level monitoring apparatus, the water level monitoring apparatus comprises a water level detector; a controller, the controller is electrically connected with the water level detector and the electric control valve; the water level detector is arranged in the mounting groove, to detect value of the water level of the tray, the controller is configured for controlling the electric control valve to be closed, when value of the water lever equals to or is greater than a preset value of the water level.

* * * * *